(12) United States Patent
Countryman et al.

(10) Patent No.: US 11,992,066 B1
(45) Date of Patent: May 28, 2024

(54) VAPE PEN KICK STAND

(71) Applicants: Theresa L. Countryman, Spokane, WA (US); Floyd F. Countryman, Sr., Spokane, WA (US)

(72) Inventors: Theresa L. Countryman, Spokane, WA (US); Floyd F. Countryman, Sr., Spokane, WA (US)

( * ) Notice: Subject to any disclaimer, the term of this patent is extended or adjusted under 35 U.S.C. 154(b) by 288 days.

(21) Appl. No.: 17/392,556

(22) Filed: Aug. 3, 2021

(51) Int. Cl.
*A24F 9/14* (2006.01)
*A24F 40/10* (2020.01)
*F16M 11/38* (2006.01)

(52) U.S. Cl.
CPC ............... *A24F 9/14* (2013.01); *A24F 40/10* (2020.01); *F16M 11/38* (2013.01); *F16M 2200/08* (2013.01)

(58) Field of Classification Search
CPC ........... A24F 9/14; A24F 40/10; F16M 11/38; F16M 2200/08
See application file for complete search history.

(56) References Cited

U.S. PATENT DOCUMENTS

| | | | | |
|---|---|---|---|---|
| 2,374,409 A * | 4/1945 | Gallagher | ............ | A47B 23/043 248/456 |
| 4,460,146 A * | 7/1984 | Raggiotti | ............... | A47G 1/142 248/456 |
| 5,078,056 A * | 1/1992 | McCauley | ............... | A47B 3/00 108/115 |
| 5,607,135 A * | 3/1997 | Yamada | ............... | A47G 1/1646 248/463 |
| 5,622,403 A * | 4/1997 | Gonda | ...................... | B63B 7/06 297/423.46 |
| 6,293,591 B1 * | 9/2001 | Pecci | ...................... | B42D 3/126 281/51 |
| 7,232,098 B2 * | 6/2007 | Rawlings | ............... | F16M 13/00 361/679.21 |
| 8,328,153 B2 * | 12/2012 | Yang | ...................... | F16M 11/10 248/370 |
| D744,159 S | 11/2015 | Lukas | | |
| D751,755 S | 3/2016 | Van Riper | | |
| D760,491 S | 7/2016 | Crowley, III | | |

(Continued)

OTHER PUBLICATIONS

Vape Pen Stand 6 Pen Vaping E-Cig Display Stand. Product Listing [online]. Copyright © 1995-2021 eBay Inc. retrieved on Dec. 8, 2020]. Retrieved from the Internet: <URL: https://www.ebay.co.uk/itm/Vape-Pen-Stand-6-Pen-Vaping-E-Cig-Display-Stand/142674416623>.

(Continued)

*Primary Examiner* — Ko H Chan
(74) *Attorney, Agent, or Firm* — Cramer Patent & Design PLLC; Aaron R. Cramer

(57) ABSTRACT

The present invention is directed to a vape pen kickstand. The vape pen kickstand may comprise a base, a pen support, a first hinge, a kickstand leg, and a second hinge. The vape pen kickstand may be a folding stand for a vaping pen to rest upon when the vaping pen is not being held. The vape pen kickstand may be unfolded to a fully unfolded configuration to hold the vaping pen. The vape pen kickstand may retain the vaping pen in an upright orientation such that vaping oil is prevented from leaking out of the vaping pen. The vape pen kickstand may fold flat when not in use such that the vape pen kickstand may be easily transported in a pocket or purse.

20 Claims, 6 Drawing Sheets

(56) References Cited

U.S. PATENT DOCUMENTS

D847,142 S * 4/2019 Furshman .................. D14/447
D857,986 S 8/2019 Nellestein

OTHER PUBLICATIONS

Vape Pen Stands—Handcrafted Natural Wood. Product Listing [online]. © 2021 O2VAPE® [retrieved on Dec. 8, 2020]. Retrieved from the Internet: <URL: https://o2vape.com/product/vape-pen-stands/>.

CTZN Aluminum Vape Pen Holder. Product Listing [online]. 2021 Cannabis Vape Reviews [retrieved on Dec. 8, 2020]. Retrieved from the Internet: <URL: https://cannabisvapereviews.com/ctzn-vape-pen-holder/>.

15 Pack Ego Silicone Sucker Stand Base Holder for Vapor Tanks and Battery Vaporizer Pens (Electronic Cigarette Personal Vaporizer Ecig Electronic Cicarette Vape Pen Not Included) Assorted Colors. Product Listing [online]. © 1996-2021, Amazon.com, Inc. [retrieved on Dec. 8, 2020]. Retrieved from the Internet: <URL: https://www.amazon.com/Ego-Vaporizer-Electronic-Cigarette-Cicarette/dp/B00KYZBPGY>.

* cited by examiner

VAPE PEN KICK STAND

RELATED APPLICATIONS

None.

FIELD OF THE INVENTION

The present invention relates generally to a kick stand and more specifically to a kick stand for a vape pen.

BACKGROUND OF THE INVENTION

The usage of vaporizer pens or "vapes" has exploded over the last few years. The promise of safe, harmless nicotine delivery without all the carcinogenic byproducts of standard cigarettes is hard to pass up for many. They are also an alternative to conventional cigarettes and may aid individuals in breaking the cigarette habit. All of these products rely on the use of reusable pen with a fixed mouthpiece. They present no dangers of second-hand smoke to others as well.

However, since such pens rely on "vape oil" as their medium, such oil has a tendency to run out of the pen when placed on a horizontal surface when not being actively used. This not only results in wasted costly oil, but a messy cleanup as well. Accordingly, there exists a need for a means by which a vape pen can be effectively held when not being actively used to prevent to the loss of vape oil. The development of the vape pen kick stand fulfills this need.

SUMMARY OF THE INVENTION

To achieve the above and other objectives, the present invention provides for a vape pen kickstand which has a base having a first end and a generally rectangular armature that forms a vape pen kickstand bottom, a pen support elevating a mouthpiece end of the vaping pen when the pen support is pivoted upwards away from the base, a leg cutout which has an aperture on the second end of the pen support such that the kickstand leg pivots into the leg cutout when the vape pen kickstand is in a fully folded configuration, one or more finger notches having a plurality of material removed from the bottom of the pen support to provide clearance adjacent to the leg cutout, a first hinge hingedly coupling the pen support to the base via the first hinge at a second end of the pen support and, a kickstand leg hingedly coupled to the pen support via a second hinge disposed at the top of the leg cutout. The base includes a fluted indentation running longitudinally on a top surface of the base. The pen support includes a pen notch at a first end of the pen support. The kickstand leg pivots in a third rotational direction to unfold the vape pen kickstand and pivots in a fourth rotational direction to fold the vape pen kickstand.

The first end of the base may be hingedly coupled to the pen support via the first hinge. The fluted indentation may have a plurality of lateral ridges is separated by a plurality of lateral troughs. Each of the lateral ridges may have a top that is at or below the top of the base. Each of the lateral troughs may have a bottom that is below the tops of the lateral ridges. The fluted indentation may extend longitudinally along the base between the first end of the base and a second end of the base. The fluted indentation may prevent an item from sliding along the base towards the second end of the base by capturing the item in a first individual trough. The item may be pushed towards the second end of the base and a first individual ridge adjacent to the first individual trough prevents movement of the item.

The pen support may pivot in a first rotational direction to unfold the vape pen kickstand and pivot in a second rotational direction to fold the vape pen kickstand. The mouthpiece end of the vaping pen may rest within the pen notch during use. The pen support may be a generally rectangular armature. The one or more finger notches may be adapted to provide clearance for the user's finger to grasp the kickstand leg in order to pivot the kickstand leg. The kickstand leg may be a generally rectangular armature that is hingedly coupled to the pen support at a first end of the leg.

The kickstand leg may pivot into the leg cutout of the pen support for storage and pivot away from the pen support during use. The vape pen kickstand may be a folding stand for a vaping pen to rest upon when the vaping pen is not being held. The vape pen kickstand may be unfolded to a fully unfolded configuration to hold the vaping pen. The vape pen kickstand may retain the vaping pen in an upright orientation such that a plurality of vaping oil is prevented from leaking out of the vaping pen. The vape pen kickstand may be folded flat to facilitate transport. The vape pen kickstand may be positioned within the leg cutout of the pen support and the pen support is positioned parallel to the base. The vape pen kickstand may be deployed by first pivoting the pen support to a partially unfolded configuration and then pivoting the kickstand leg to the fully unfolded configuration.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
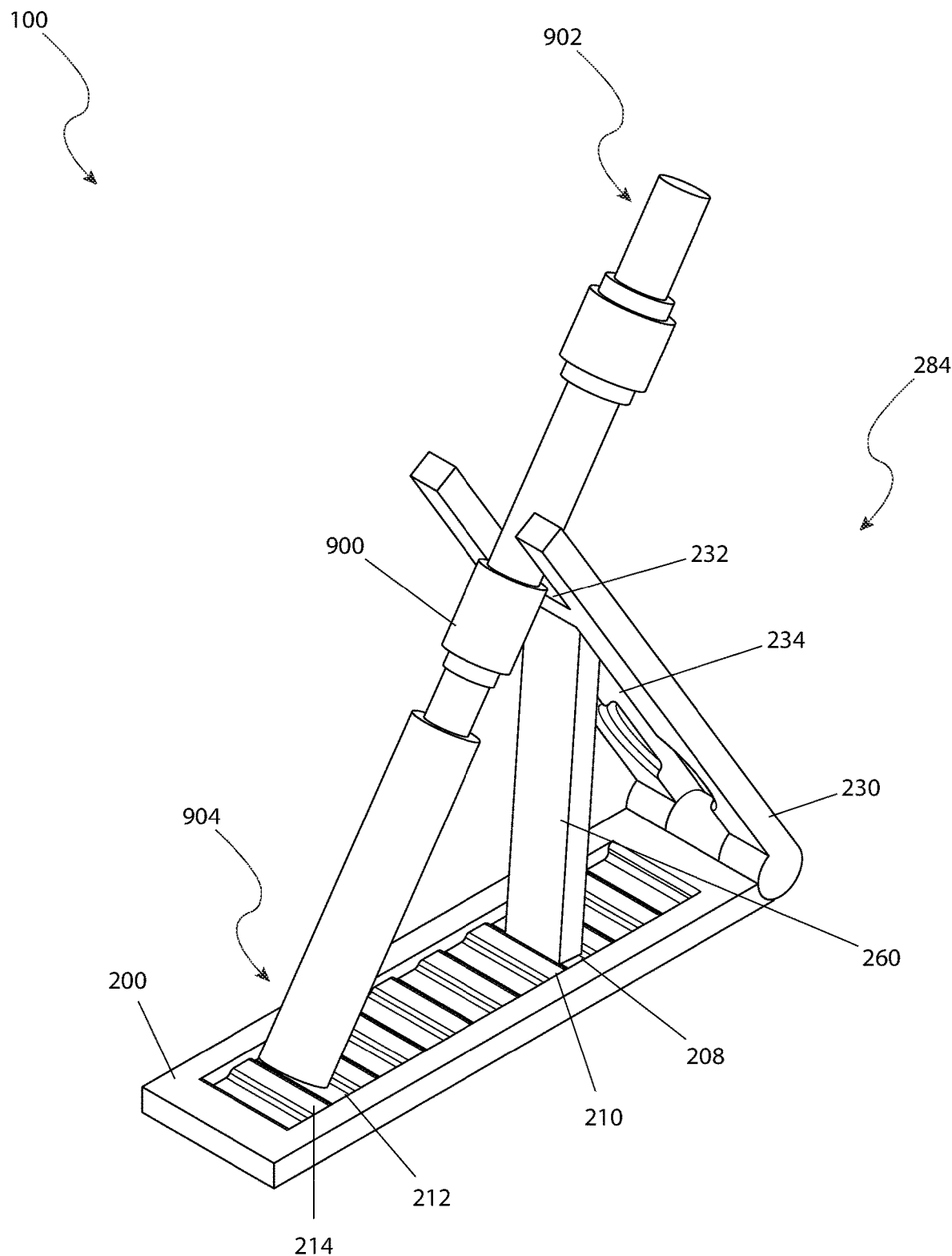
FIG. 1 is a perspective view of a vape pen kickstand, according to an embodiment of the present invention illustrating the invention in the fully unfolded configuration.
Figure 2:
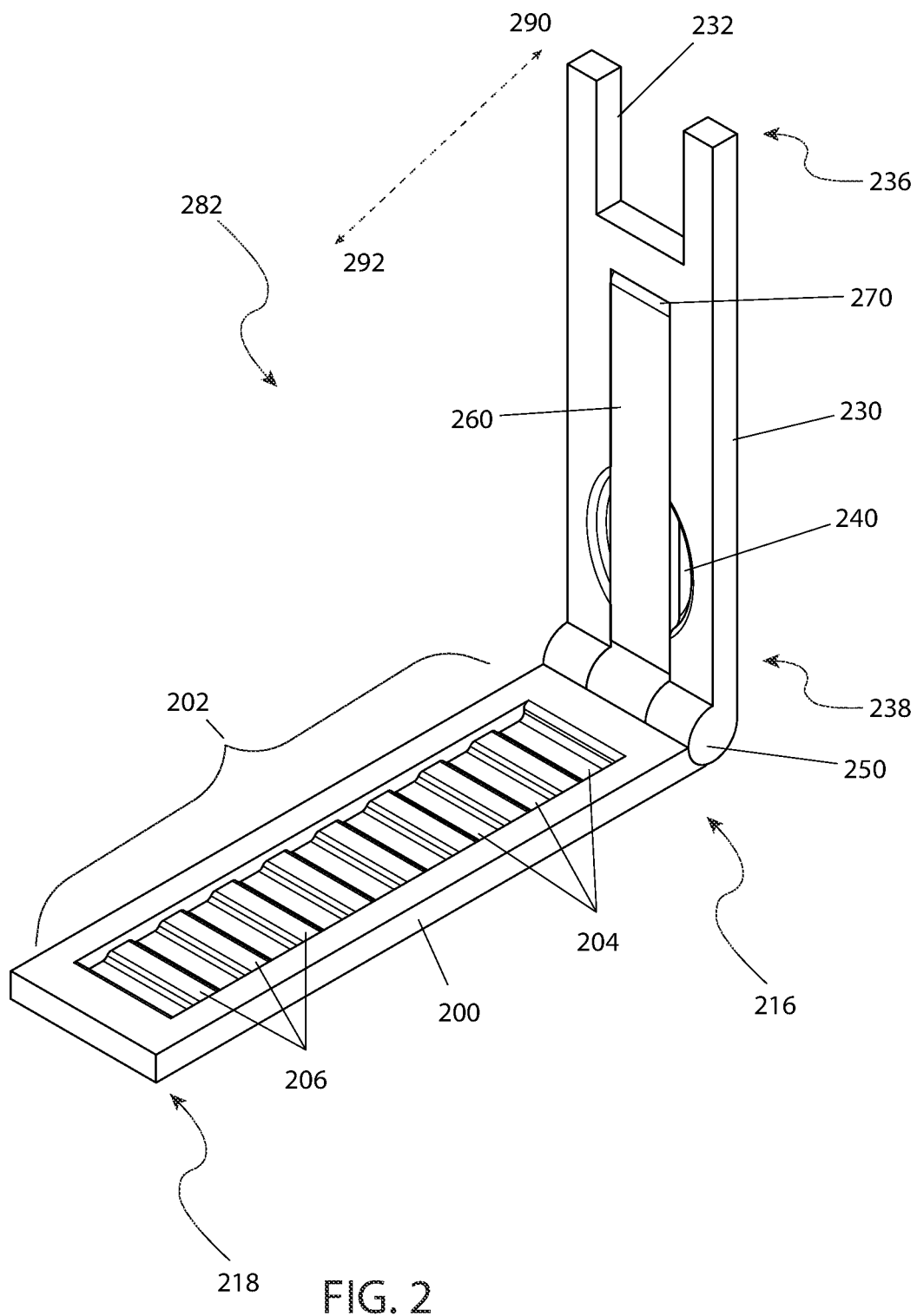
FIG. 2 is a perspective view of a vape pen kickstand, according to an embodiment of the present invention illustrating the invention in the partially unfolded configuration.
Figure 3:
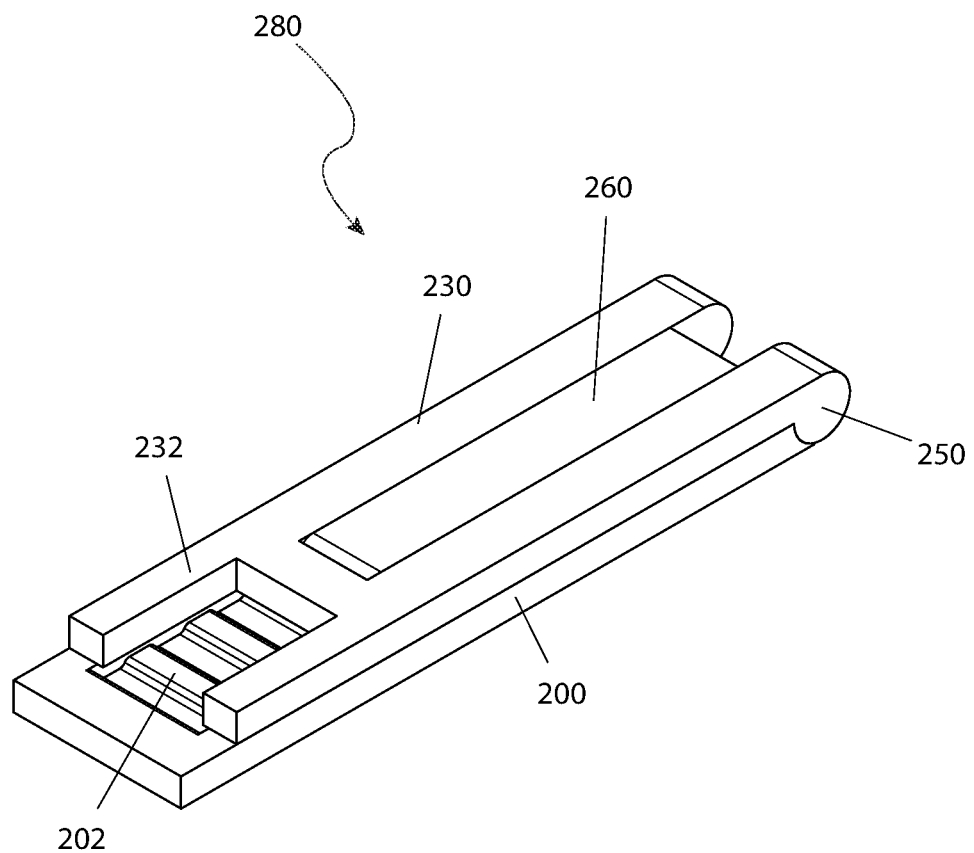
FIG. 3 is a perspective view of a vape pen kickstand, according to an embodiment of the present invention illustrating the invention in the fully folded configuration.
Figure 4:
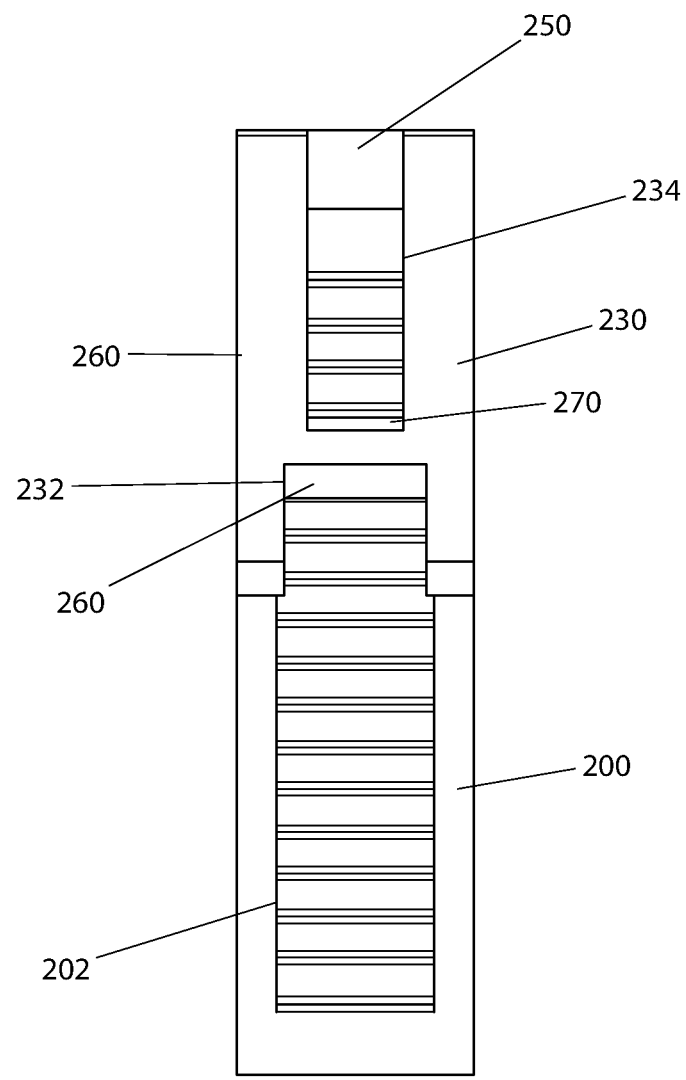
FIG. 4 is a top view of a vape pen kickstand, according to an embodiment of the present invention.
Figure 5:
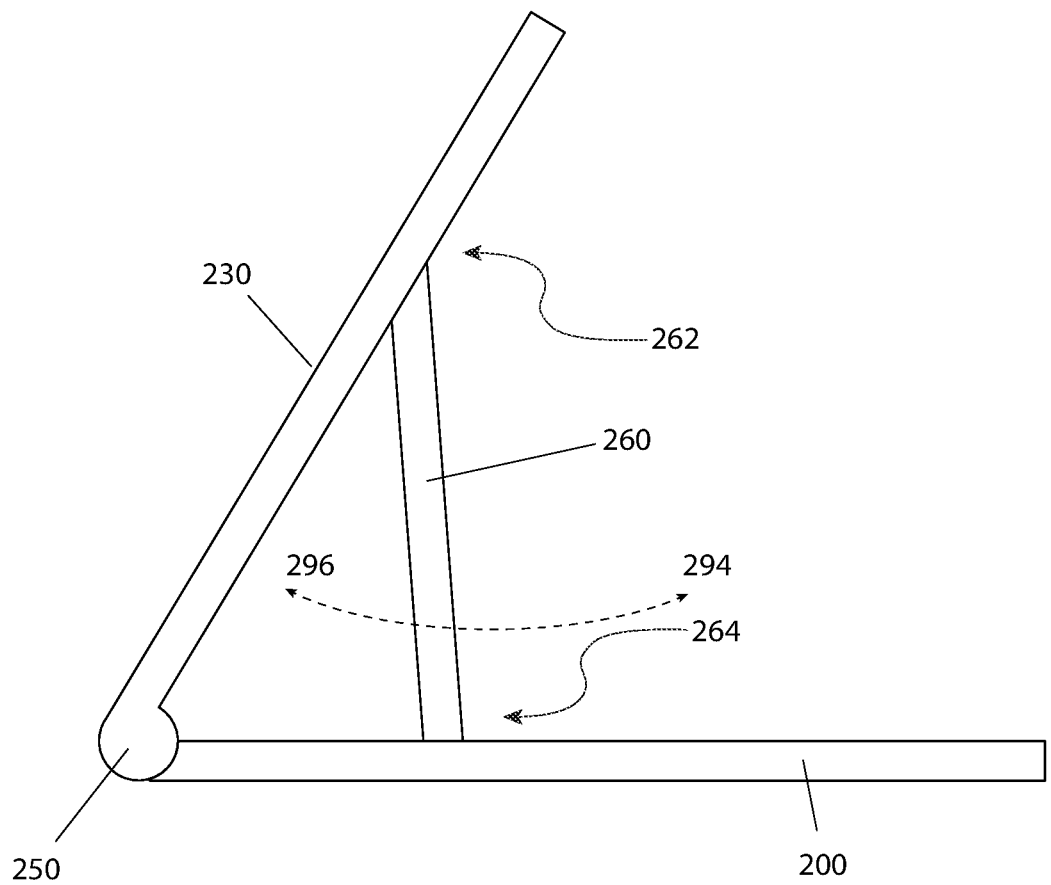
FIG. 5 is a side view of a vape pen kickstand, according to an embodiment of the present invention.
Figure 6:
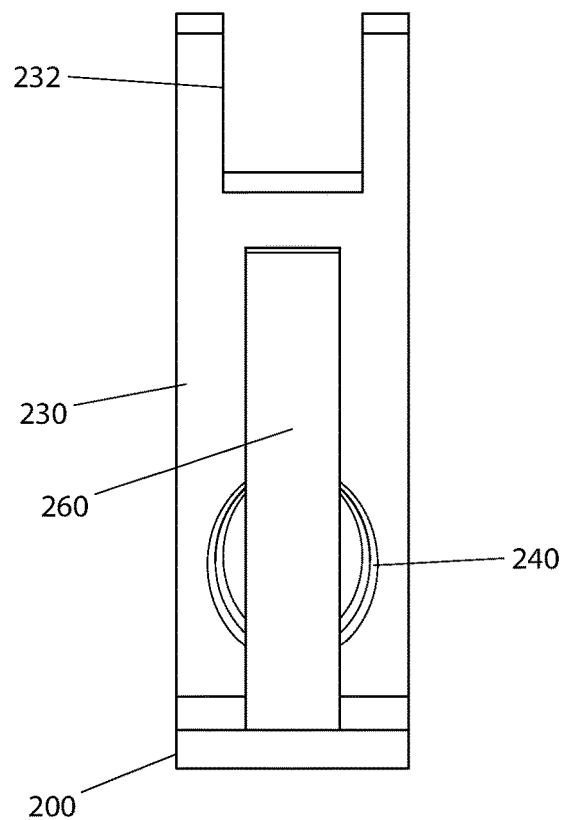
FIG. 6 is a front view of a vape pen kickstand, according to an embodiment of the present invention.
Figure 7:
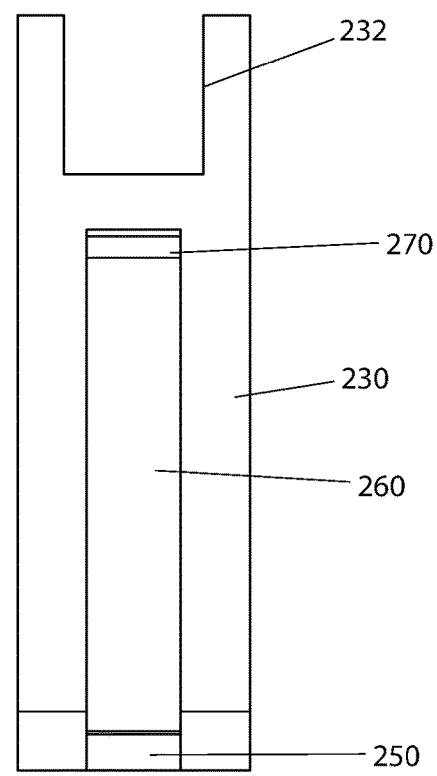
FIG. 7 is a rear view of a vape pen kickstand, according to an embodiment of the present invention.

DESCRIPTIVE KEY 100 vape pen kickstand
200 base
202 fluted indentation
204 lateral trough
206 lateral ridge
208 first individual trough
210 first individual ridge
212 second individual trough
214 second individual ridge
216 first end of the base
218 second end of the base
230 pen support
232 pen notch 234 leg cutout
236 first end of the pen support
238 second end of the pen support
240 finger notch
250 first hinge
260 kickstand leg
262 first end of the leg
264 second end of the leg
270 second hinge
280 fully folded configuration
282 partially unfolded configuration
284 fully unfolded configuration
290 first rotational direction
292 second rotational direction
294 third rotational direction
296 fourth rotational direction
900 vaping pen
902 mouthpiece end
904 battery end

DESCRIPTION OF THE INVENTION

The present invention is directed to a vape pen kickstand (herein described as the "invention") 100. The invention 100 may comprise a base 200, a pen support 230, a first hinge 250, a kickstand leg 260, and a second hinge 270. The invention 100 may be a folding stand for a vaping pen 900 to rest upon when the vaping pen 900 is not being held. The invention 100 may be unfolded to a fully unfolded configuration 284 to hold the vaping pen 900. The invention 100 may retain the vaping pen 900 in an upright orientation such that vaping oil is prevented from leaking out of the vaping pen 900. The invention 100 may fold flat when not in use such that the invention 100 may be easily transported in a pocket or purse.

The invention 100 may be carried while folded into a fully folded configuration 280. In the fully folded configuration 280, the kickstand leg 260 may be positioned within a leg cutout 234 of the pen support 230 and the pen support 230 may be positioned parallel to the base 200.

The invention 100 may be deployed by first pivoting the pen support 230 to a partially unfolded configuration 282 and by then pivoting the kickstand leg 260 to the fully unfolded configuration 284.

The base 200 may be a generally rectangular armature that forms the bottom of the invention 100. The base 200 may comprise a fluted indentation 202 running longitudinally on the top surface of the base 200. A first end of the base 216 may hingedly couple to the pen support 230 via the first hinge 250.

The fluted indentation 202 may comprise a plurality of lateral ridges 206 separated by a plurality of lateral troughs 204. The fluted indentation 202 may extend longitudinally along the base 200 between the first end of the base 216 and a second end of the base 218. The tops of the plurality of lateral ridges 206 may be at or below the height of the top of the base 200. The bottoms of the plurality of lateral troughs 204 may be below the height of the tops of the plurality of lateral ridges 206. The fluted indentation 202 may prevent an item from sliding along the base 200 towards the second end of the base 218 by capturing the bottom of the item in a first individual trough 208. If the item is pushed towards the second end of the base 218, a first individual ridge 210 adjacent to the first individual trough 208 may prevent movement of the item.

The pen support 230 may elevate a mouthpiece end 902 of the vaping pen 900 when the pen support 230 is pivoted upwards away from the base 200. The pen support 230 may be a generally rectangular armature. The pen support 230 may comprise a pen notch 232 at a first end of the pen support 236. The mouthpiece end 902 of the vaping pen 900 may rest within the pen notch 232 during use. The pen support 230 may be hingedly coupled to the base 200 via the first hinge 250 at a second end of the pen support 238. The pen support 230 may pivot in a first rotational direction 290 to unfold the invention 100 and may pivot in a second rotational direction 292 to fold the invention 100.

The pen support 230 may comprise the leg cutout 234. The leg cutout 234 may be an aperture on the second end of the pen support 238 such that the kickstand leg 260 may pivot into the leg cutout 234 when the invention 100 is in the fully folded configuration 280. The kickstand leg 260 may be hingedly coupled to the pen support 230 via the second hinge 270 at the top of the leg cutout 234. The kickstand leg 260 may pivot in a third rotational direction 294 to unfold the invention 100 and may pivot in a fourth rotational direction 296 to fold the invention 100.

The pen support 230 may comprise one (1) or more finger notches 240. The one (1) or more finger notches 240 may comprise material removed from the bottom of the pen support 230 to provide clearance adjacent to the leg cutout 234. The one (1) or more finger notches 240 may be adapted to provide clearance for the user's finger to grasp the kickstand leg 260 in order to pivot the kickstand leg 260.

The kickstand leg 260 may be a generally rectangular armature that is hingedly coupled to the pen support 230 at a first end of the leg 262. The kickstand leg 260 may pivot into the leg cutout 234 of the pen support 230 for storage and may pivot away from the pen support 230 during use. During use, a second end of the leg 264 may rest within the fluted indentation 202.

The invention 100 may be operable to hold the vaping pen 900 when the invention 100 is in the fully folded configuration 280, a battery end 904 of the vaping pen 900 in placed into one (1) of the plurality of lateral troughs 204, and the mouthpiece end 902 of the vaping pen 900 in placed into the pen notch 232. The second end of the leg 264 may rest within the first individual trough 208 and the first individual ridge 210 may prevent the kickstand leg 260 from sliding. The battery end 904 of the vaping pen 900 may rest within a second individual trough 212 and a second individual ridge 214 may prevent the vaping pen 900 from sliding.

In use, the invention 100 may be placed in the fully unfolded configuration 284 by pivoting the pen support 230 and the kickstand leg 260 and by placing the second end of the leg 264 into one of the plurality of lateral troughs 204. The vaping pen 900 may be placed onto the invention 100 with the mouthpiece end 902 of the vaping pen 900 down, resting in one (1) of the plurality of lateral troughs 204, and with the mouthpiece end 902 of the vaping pen 900 resting within the pen notch 232. When no longer needed, the invention 100 may be folded into the fully folded configuration 280 for transport by pivoting the kickstand leg 260 and the pen support 230 to their original orientations.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A vape pen kickstand, comprising: a base having a first end and a generally rectangular armature that forms a vape pen kickstand bottom, the base includes a fluted indentation running longitudinally on a top surface of the base;

a pen support having a first end and a second end wherein the first end configured to support a vaping pen having a mouthpiece end; the pen support having a leg cutout for receiving a kickstand leg in a fully folded configuration;

the pen support elevating the mouthpiece end of the vaping pen when the pen support is pivoted upwards away from the base, the pen support includes a pen notch at the first end of the pen support; the leg cutout having an aperture on the second end of the pen support such that the kickstand leg pivots into the leg cutout when the vape pen kickstand is in the fully folded configuration; one or more finger notches having a plurality of material removed from a bottom of the pen support to provide clearance adjacent to the leg cutout;

a first hinge hingedly coupling the pen support to the base via the first hinge at the second end of the pen support; and, the kickstand leg hingedly coupled to the pen support via a second hinge disposed at a top of the leg cutout, the kickstand leg pivots in a first rotational direction to unfold the vape pen kickstand and pivots in a second rotational direction to fold the vape pen kickstand.

2. The vape pen kickstand, according to claim 1, wherein the first end of the base is hingedly coupled to the pen support via the first hinge.

3. The vape pen kickstand, according to claim 1, wherein the fluted indentation having a plurality of lateral ridges is separated by a plurality of lateral troughs.

4. The vape pen kickstand, according to claim 3, wherein each of the lateral ridges have a top that is at or below the top of the base.

5. The vape pen kickstand, according to claim 3, wherein each of the lateral troughs have a bottom that is below the tops of the lateral ridges.

6. The vape pen kickstand, according to claim 1, wherein the fluted indentation extends longitudinally along the base between the first end of the base and a second end of the base.

7. The vape pen kickstand, according to claim 1, wherein the fluted indentation prevents the vaping pen from sliding along the base towards the second end of the base by capturing the item in a first individual trough.

8. The vape pen kickstand, according to claim 7, wherein the item is pushed towards the second end of the base and a first individual ridge adjacent to the first individual trough prevents movement of the item.

9. The vape pen kickstand, according to claim 1, wherein the pen support pivots in a first rotational direction to unfold the vape pen kickstand and pivot in a second rotational direction to fold the vape pen kickstand.

10. The vape pen kickstand, according to claim 1, wherein the mouthpiece end of the vaping pen rests within the pen notch during use.

11. The vape pen kickstand, according to claim 1, wherein pen support is a generally rectangular armature.

12. The vape pen kickstand, according to claim 1, wherein the one or more finger notches are adapted to provide clearance for the user's finger to grasp the kickstand leg in order to pivot the kickstand leg.

13. The vape pen kickstand, according to claim 1, wherein the kickstand leg is a generally rectangular armature that is hingedly coupled to the pen support at a first end of the leg.

14. The vape pen kickstand, according to claim 1, wherein the kickstand leg pivots into the leg cutout of the pen support for storage and pivot away from the pen support during use.

15. The vape pen kickstand, according to claim 1, wherein the vape pen kickstand is a folding stand for a vaping pen to rest upon when the vaping pen is not being held.

16. The vape pen kickstand, according to claim 15, wherein the vape pen kickstand is unfolded to a fully unfolded configuration to hold the vaping pen.

17. The vape pen kickstand, according to claim 1, wherein the vape pen kickstand retains the vaping pen in an upright orientation such that a plurality of vaping oil is prevented from leaking out of the vaping pen.

18. The vape pen kickstand, according to claim 1, wherein the vape pen kickstand is folded flat to facilitate transport.

19. The vape pen kickstand, according to claim 1, wherein the vape pen kickstand leg is positioned within the leg cutout of the pen support and the pen support is positioned parallel to the base when in a collapsed position.

20. The vape pen kickstand, according to claim 1, wherein the vape pen kickstand is deployed by first pivoting the pen support to a partially unfolded configuration and then pivoting the kickstand leg to the fully unfolded configuration.

* * * * *